March 22, 1932.  H. R. TRYON ET AL  1,850,903
PROJECTING MACHINE
Filed Jan. 3, 1930  4 Sheets-Sheet 1

WITNESSES
Edw. Thorpe
Chris Feinle

INVENTORS
H. R. Tryon
John G. Nilsson
BY Munn &Co.
ATTORNEY

March 22, 1932.  H. R. TRYON ET AL  1,850,903
PROJECTING MACHINE
Filed Jan. 3, 1930    4 Sheets-Sheet 4

WITNESSES
Edw. Thorpe
Chris Feinle

INVENTORS
H. R. Tryon
John G. Nilsson
BY
ATTORNEY

Patented Mar. 22, 1932

1,850,903

UNITED STATES PATENT OFFICE

HOWARD ROBERT TRYON AND JOHN G. NILSSON, OF PROCTOR, VERMONT

PROJECTING MACHINE

Application filed January 3, 1930. Serial No. 418,376.

This invention relates to a projecting machine designed and adapted for projecting intelligence matter and pictures on a screen forming a part of the machine.

The invention contemplates a machine of the indicated character having numerous uses, among which may be mentioned the use in an office for keeping records, data and other information, enabling executives, and others, to quickly, conveniently and accurately present or exhibit the matter of the kinds specified for the purpose of speeding up business transactions by saving time usually wasted in hunting through file cabinets and the like; and also to enable lecturers and salesmen to rapidly and accurately present illustrative and instructive matter for obvious purposes.

With the foregoing and other objects in view the invention resides in the particular provision, operation and combinations of the parts hereinafter fully described.

The nature of the invention and its distinguishing features and advantages will appear when the following specification is read in connection with the accompanying drawings, in which Figure 1 is a plan view of a machine constructed in accordance with the invention, portions of the machine being broken away to show certain features thereof;

Figure 1:
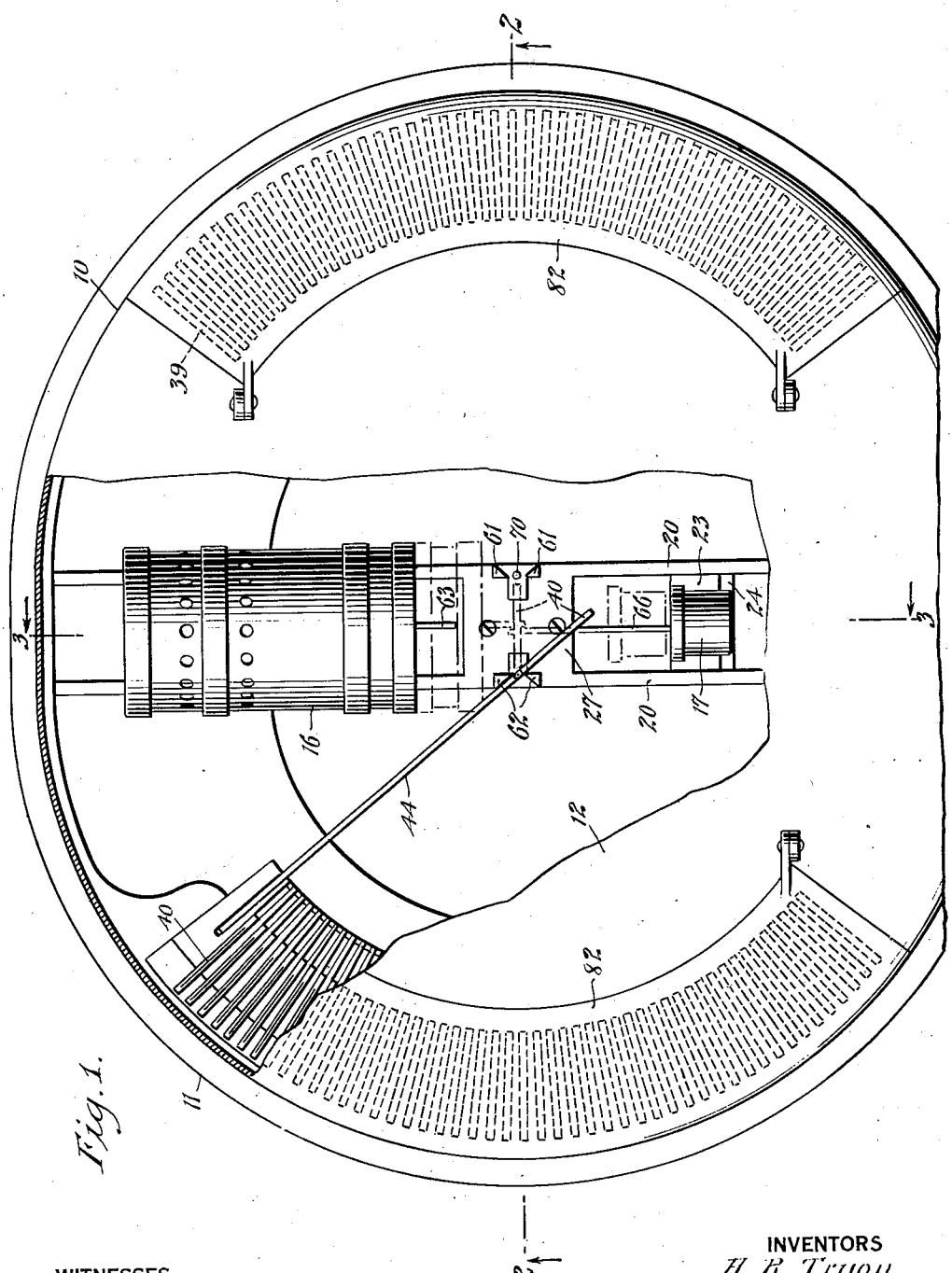
Figure 2:
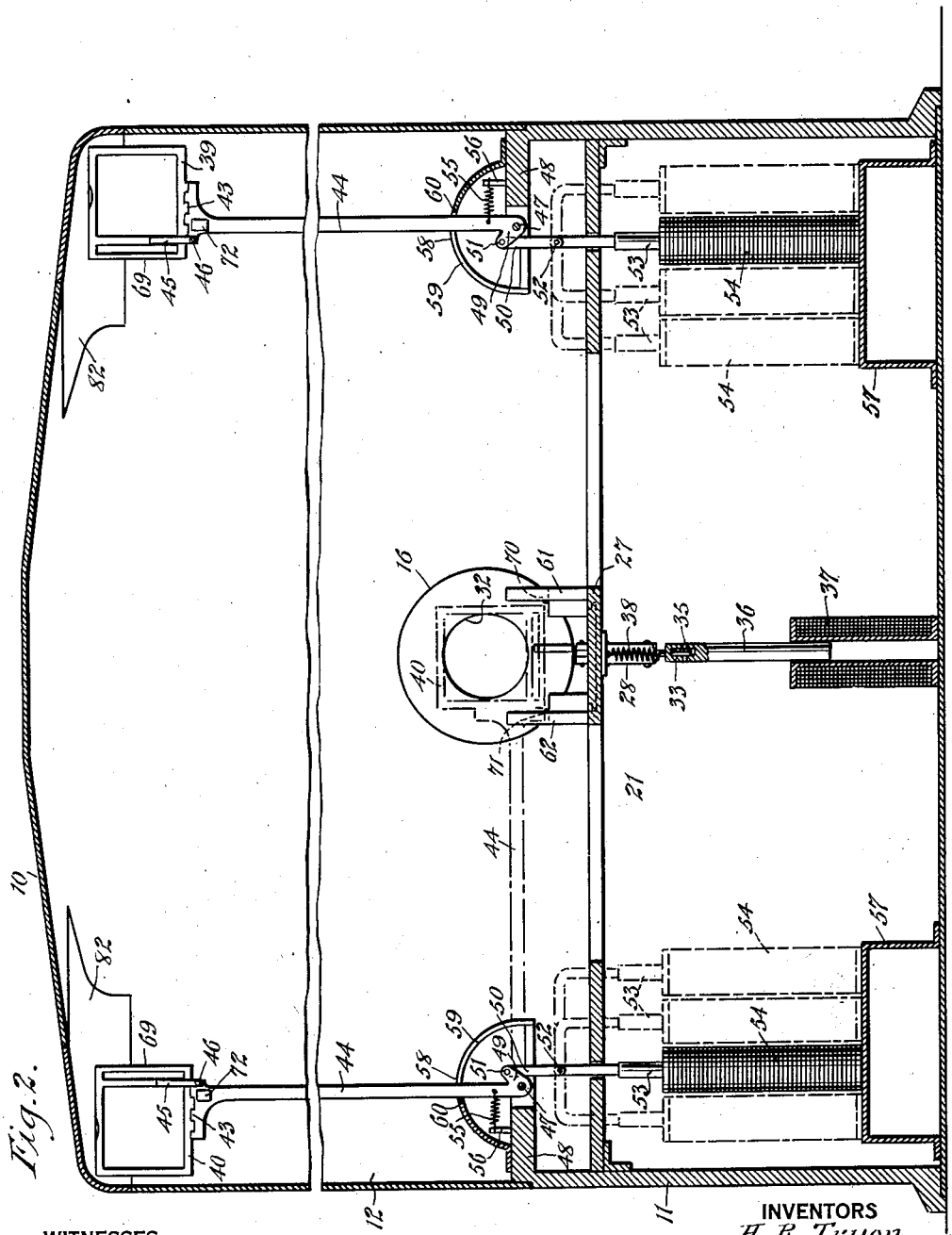
Figure 2 is a section on the line 2—2 of Figure 1, portions thereof being broken away.
Figure 3:
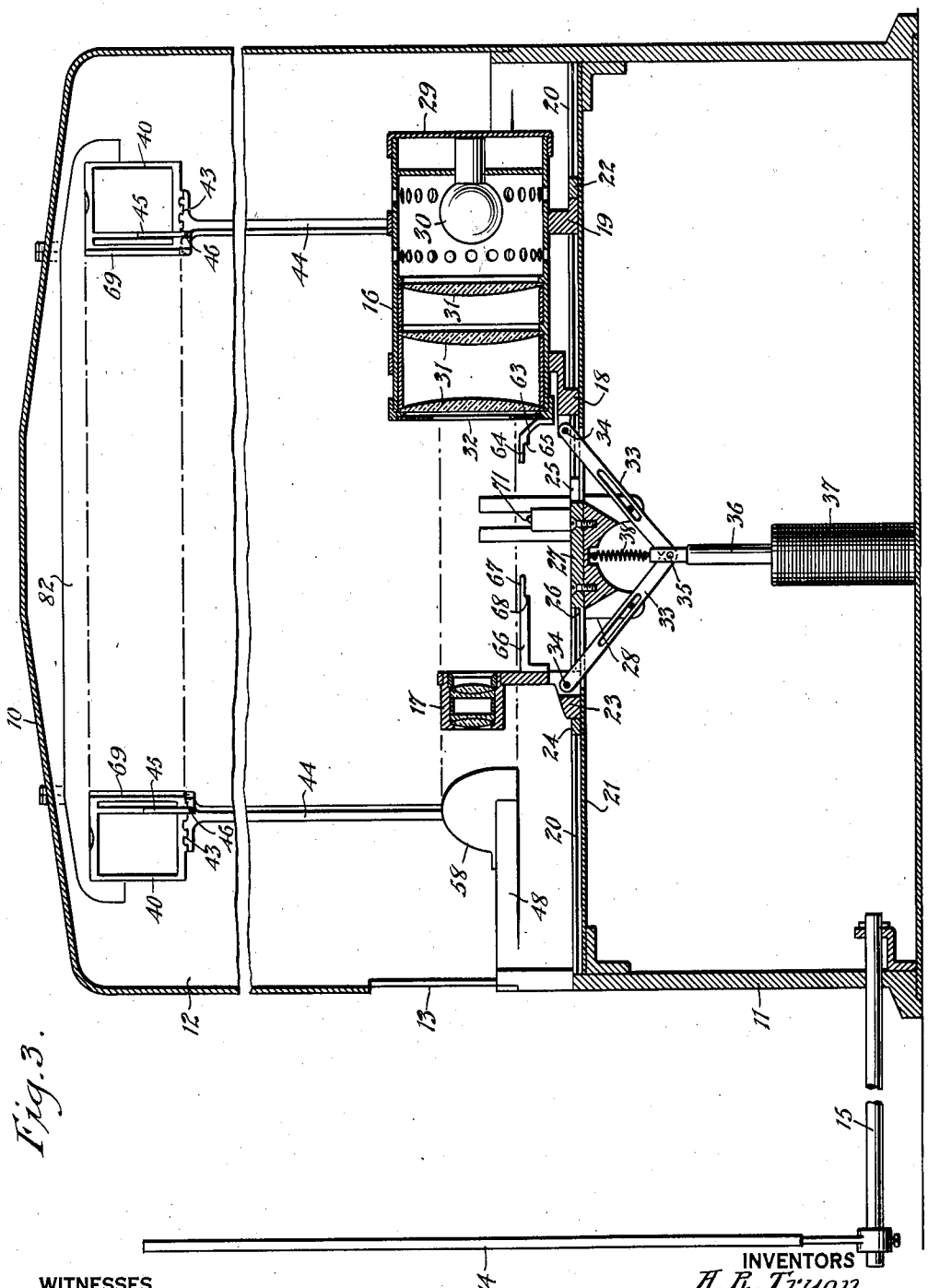
Figure 3 is a section taken on the line 3—3 of Figure 1, portions being taken away, and showing the screen which forms a part of the machine.
Figure 4:
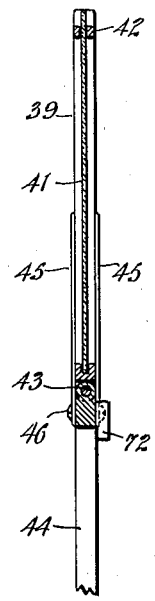
Figure 4 is a section of one of the holder frames and a portion of the arm which supports the same.
Figure 5:
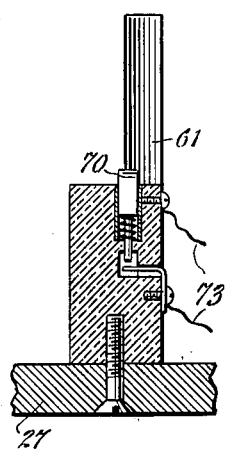
Figure 5 is a section of a switch which is operated by the holder frames of the machine.
Figure 6:
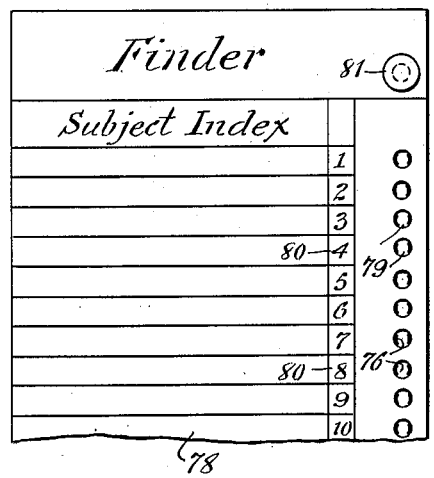
Figure 6 is a face view of a portion of the finder chart.

Referring now more particularly to the drawings, it will be apparent that the machine in the illustrated embodiment of the invention includes a casing or housing 10 consisting of a lower section 11, and an upper section 12 removably mounted on the lower section 11. An opening 13 is formed in part in the lower section 11 and in part in the upper section 12, through which a beam of light is projected by a device to be described hereinafter on a screen 14 adjustably carried by a suitable holder, bracket or supporting means 15 positioned on the lower section 11 of the casing or housing 10. The screen 14 may be of any preferred form and size. The device for projecting the beam of light consists of a light condenser 16 and a separate projecting lens 17. The condenser 16 and the lens 17 are mounted for movement toward and away from each other to predetermined relationships, and this is accomplished in a manner presently to be described. The condenser 16 is mounted on slides 18 and 19 which move in spaced parallel guides 20 secured in place on the top of a suitable support or platform 21 secured to the lower section 11 of the casing or housing 10 interiorly thereof in a horizontal positon. The condenser 16 has limited movement in one direction by reason of a stop 22, secured to the support 21, which stop 22 is engaged by the slide 19. The projecting lens 17 is mounted on a slide 23 which also has guided movement in guides 20. The lens 17 has limited movement in one direction by reason of a stop 24, secured to the support 21, which stop 24 is engaged by the slide 23. The stops 22 and 24 are engaged respectively by the slides 19 and 23 when the condenser 16 and the lens 17 are moved away from each other. The condenser 16 and the lens 17 have limited movement toward each other by reason of the engagement of the slides 18 and 23, respectively, with stops or abutments 25 and 26 presented by a part 27 of the support 21. A bracket 28 is secured to the under side of the part 27. The condenser 16 comprises a casing 29 having an electric lamp 30 positioned at one end thereof and plano-convex lenses 31 within the casing 29. The lenses 31 condense rays of light from the lamp 30 and project the same through an opening 32 in the casing 29, in the form of a beam which passes through the projecting lens 17, and from the lens 17 through the opening 13 in the casing or housing 10 on the screen 14.

In order to cause the simultaneous movement of the condenser 16 and the projecting lens 17 away from each other and also to simultaneously move the condenser 16 and the projecting lens 17 toward each other, there is provided means presently to be described. Use is made of a spring actuated toggle. This toggle includes levers 33 each of which has sliding and pivoting movement. These levers 33 are carried by the bracket 28, and are respectively pivotally connected as at 34 with the slides 18 and 23, and also pivotally connected as at 35 with the upper end of an armature or core 36 constituting a part of a solenoid which includes an electromagnetic coil 37. The toggle also includes a contractile spring 38 which has one end thereof connected with the bracket 28 and the opposite end thereof connected with the upper end of the core 36. The spring 38 has a normal tendency to actuate the levers 33 to move the condenser 16 and the projecting lens 17 away from each other to a predetermined spaced relationhip in which stops 22 and 24 serve as a limiting means. When a solenoid 37 is energized its armature 36 will be drawn downwardly thereby actuating the levers 33 and causing the condenser 16 and the projecting lens 17 to move toward each other to a predetermined spaced relationship in which the slides 18 and 23 will respectively engage the abutments 25 and 26.

Suitable frames are mounted for movement from non-projecting positions to projecting positions between the condenser 16 and the projecting lens 17 by means and in a manner to be described. A series of frames 39 are arranged at one side of the casing 10 and a series of similar frames 40 are arranged at the opposite side of the casing 10. Each of the frames is of rectangular formation and is designed to hold a transparent element such as a glass plate or film 41 containing any preferred intelligence matter or pictures to be projected on the screen 14. Each of the frames is therefore provided with a slot 42 for introducing the element 41 into the frame and for removing the same therefrom. Each frame 39 and 40 is hingedly connected as at 43 on the upper end of an arm 44 in order that the frame may have hinged or pivotal movement with respect to the arm. The frame is under the influence of a pair of leaf springs 45, there being one spring bearing against each side of the frame and both of said springs being secured as at 46 to the arm 44. The lower end of each arm 44 is pivotally mounted as at 47 on a flange 48 which extends laterally inward from the casing section 11. The lower end of each arm has a lateral and angularly disposed lug 49. A link 50 is pivotally connected at one end as at 51 with the lug 49 and its opposite end is pivotally connected as at 52 with the upper end of an armature or core 53 constituting a part of a solenoid which includes an electromagnetic coil 54. A contractile spring 55 has one end thereof connected with the lower end of each arm 44 and its opposite end is connected with a fixed pin 56 on the flange 48. The spring 55 serves to return a related arm 44 to a normal position in which it will be vertically disposed to hold the related frame 39 or 40, as the case may be, in a non-projecting position. When each solenoid coil 54 is energized, the related armature 53 will be drawn downwardly thereby imparting swinging movement to the related arm 44 causing the same to move downwardly approximately 90°. The solenoid coils 54 are arranged within the casing sections 11 below the support 21, there being one group for the arms 44 having the frames 39 and a second group for the arms 44 having the frames 40. The upper ends of some of the armatures 53 are of L-shape in order that the coils of each group may be closely nested on a base member 57 resting on the bottom of the lower casing section 11. The armatures 53 extend upwardly through the openings in the support 21. A sector-shaped member 58 which is arcuate in cross section is secured to each flange 48 on the top thereof, and is provided with slots 59 equal in number to the number of arms 44 with which the member 58 is associated. The arms 44 respectively extend through the slots 59 and have guided movement by the walls of the same. The end wall 60 of each slot 59 is engaged by the related arm 44 and in this way the arm is limited in its movement to the vertically disposed position. The arm 44 having the frames 39 move downwardly between spaced abutments 61 rising from the part 27, as shown in Figure 1. The arms 44 having frames 40 move between spaced abutments 62 rising from the part 27, the abutments 62 being similar to the abutments 61. It is to be understood that each of the arms 44 will be moved downwardly between the related abutments 61 or 62, as the case may be, by the energization of the related solenoid coil 54. The condenser casing 29 has positioned thereon a pusher 63 having an end portion 64 and a shoulder 65. The slide 23 which supports the lens 17 has a pusher 66 having an end portion 67 and a shoulder 68. The pusher 66 is out of alinement with the pusher 63. The pushers 63 and 66 extend toward each other. In the present instance there are forty-nine frames 39 and forty-nine frames 40. The pusher 63 serves in conjunction with twenty-four of the frames 39 and twenty-four of the frames 40, to move each of the same relatively to its arm 44, when the latter is in the horizontally disposed position. Likewise, the pusher 66 serves in conjunction with twenty-four of the frames 39 and twenty-four of the frames 40. It will be apparent that the middle or twenty-fifth frame of each series will not require any movement by the pushers 63 and 66, since the arm 44, which carries it, is disposed to move in a plane at a right angle with respect to the beam of light. It will now be apparent that when one of the arms 44 having one of the frames 39 or 40, as the case may be, is in the down position, the pusher 63 will encounter the member 69 on the frame. The shoulder 65 of the pusher will engage a side face of the member 69 thereby causing the frame 40 to move on its hinged connection 43 while the related arm 44 is held against movement by one of the abutments 61 or 62. The particular frame will be disposed in a projecting position transversely of the beam of light projected by the condenser 16. The pusher 66 on the condenser casing 29 encounters the member 69 on the particular frame 39 or 40, as the case may be, the shoulder 68 engaging one face of the member 69 causing the frame to move on its hinged connection 43 while the arm is held against movement by one of the abutments 61. When each frame 39 or 40 is in the projecting position, the end portions 64 and 67 respectively of the pushers 63 and 66 will rest in contact with the member 69 of the frame. The member 69 of each frame 39 serves to actuate an electric switch 70 positioned on the part 27, and the member 69 of each of the frames 40 serves to actuate a similar switch 71 positioned on the part 27. This action takes place when each arm 44 reaches the horizontally disposed position. Each of the arms 44 will be provided with a suitable pad 72 which acts as a cushion for the arm when it is in the down position between the related abutments 61 or 62, as the case may be. The pads 72 will be of different thicknesses to compensate for the different angular positions in which the arms 44 are brought between the abutments, and to prevent lost motion as the frames are moved by the pushers 63 and 66.

Figure 7:
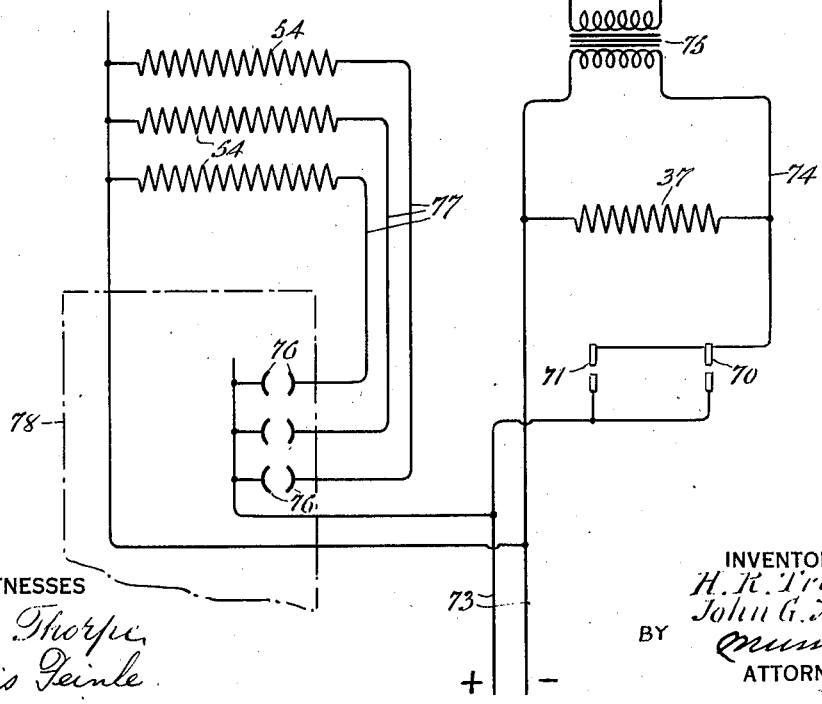
Figure 7 is a diagrammatic view of the electrical circuits and appurtenances connected therein, together with a portion of the finder chart, which is shown in dot and dash lines.

By reference to Figure 7 it will be apparent that the machine includes a main electric circuit consisting of the feed wires 73 each connected with a source of electrical energy. A branch circuit 74 connects the solenoid coil 37 and a transformer 75 in parallel with the wire 73. The condenser lamp 30 is connected with the transformer 75. Each of the solenoid coils 54 has electrically connected therewith a controller which consists of spaced contacts 76. Branch circuits 77 each connect one of the solenoid coils 54 and the related contacts 76 in parallel with the feed wires 73. Use is made of a finder chart 78 consisting of a plate having holes 79 therein along one edge thereof. These holes 79 are equal in number to the number of controllers consisting of the contacts 76, there being one pair of contacts 76 for each hole 79. Each of the holes 79 is identified by a number 80 which corresponds to a particular one of the frames 39 or 40. Each number 80 is imprinted on the chart 78 adjacent the related hole 79 and appropriate indices may be placed on the chart 78 beside each number 80 to correspond to and to identify the subject matter of the particular plate or film carried by a particular one of the frames 39 or 40. Use is made of a conducting contact plug 81 which may be inserted in either one of the holes 79 to bridge the related contacts 76. This plug 81 may be held in place ready for use in a suitable socket or hole in the chart 78.

From the foregoing it will be apparent that when the plug 81 is inserted in one of the holes 79, to bridge the related contacts 76, one of the circuits 77 will be closed allowing current to flow from the feed wires 73 through the related solenoid coil 54 to energize the same. This will cause the armature 53 of the related coil to move downwardly, and as a consequence the arm 44 connected therewith will be swung downwardly on its pivot 47 between the related abutments 61 or 62, as the case may be. When the arm 44 reaches the horizontal position the member 69 on the related frame will press on the button of the switch 70 or 71, as the case may be, thereby closing the branch circuit 74. Current will then flow through the solenoid coil 37 causing its armature 36 to move downwardly causing the actuation of the toggle, and as a result the condenser 16 and the lens 17 will move toward each other. This movement of the condenser and lens will cause similar movement of the pushers 63 and 66 for the purpose mentioned. In moving toward each other, the condenser and lens will assume a relationship in which the lens will be in the proper focal position with respect to the condenser and film or plate 41 in the particular frame 39 or 40, to project the matter appearing on the film or plate on the screen 14. When the switch 70 or 71 is closed current also flows in the transformer 75 lighting the lamp 30. When the plug 81 is withdrawn from a particular hole 79 out of engagement with the related pair of contacts 76, the related coil 54 will be deenergized, allowing the particular arm 44 to be returned with its frame to the non-projecting position. At the same time the switch 70 or 71 will automatically open, thereby opening the branch circuit 74, shutting off the current to the coil 37 and the transformer 75. The lamp 30 will go out, and the toggle spring 38 will come into play and actuate the levers 33 moving the condenser 16 and lens 17 away from each other to the normal relationship.

The casing section 12 has hinged lids 82 which afford access to the frames 39 and 40 while in the non-projecting positions for changing the plates or films, or for any other purpose in connection therewith.

It is to be understood that the invention is not restricted to the precise arrangement of parts shown and described, as details of construction may be modified and rearranged without departing from the spirit of the invention, the scope of which is limited only by the terms of the appended claims.

Claims:

1. A machine of the class described having the combination of a device for projecting a beam of light, said device consisting of a light condenser and a projecting lens, said condenser and lens each being mounted for movement toward and away from each other; a plurality of film or plate holders each mounted for movement into and out of a projecting position between said condenser and lens in the path of the light beam, means to selectively move said holders into and out of their projecting positions, means to move the condenser and lens to bring the latter into proper focal position with respect to the condenser, as each of said holders is brought into its projecting position, and means to move the condenser and lens out of focal positions when each holder is moved out of its projecting position.

2. In a machine of the class described, the combination of a device for projecting a beam of light, said device consisting of a light condenser and a projecting lens, said light condenser and projecting lens being mounted for movement toward and away from each other; and means operable to cause the movement of the light condenser and the projecting lens away from each other to a predetermined spaced relationship, and said means also being operable to cause the movement of the light condenser and the projecting lens toward each other to a predetermined spaced relationship giving the proper focal range.

3. In a machine of the class described, the combination of a device for projecting a beam of light, said device consisting of a light condenser and a projecting lens, said light condenser and projecting lens being mounted for movement toward and away from each other; and a spring actuated toggle to cause the movement of the light condenser and the projecting lens simultaneously toward and simultaneously away from each other to predetermined relationships.

4. In a machine of the class described, the combination of a device for projecting a beam of light, said device consisting of a light condenser and a projecting lens movable with respect to each other; a plurality of film or plate holders each mounted for movement into and out of a projecting position in which it is disposed transversely of the light beam, means adapted to be actuated to selectively move the holders into and out of their projecting positions, means adapted to be actuated to move the projecting lens into proper focal position with respect to the condenser, and a common means adapted to be actuated, to actuate the holder actuating means and the lens actuating means.

5. A machine of the class described having the combination of a device for projecting a beam of light, said device consisting of a light condenser and a projecting lens mounted for movement toward and away from each other, yieldable means operable to move said condenser and lens away from each other into a normal predetermined spaced relation, means to move the condenser and lens toward each other to bring the lens into proper focal position with respect to the condenser, a plurality of film or plate holders, each of said holders being pivotally mounted on one end of a pivotally mounted arm, whereby to bring each holder into a position between the condenser and the lens on movement of its arm, means connected with each arm operable to cause the pivotal movement of the arm to bring its holder into the aforesaid position, means to cause the pivotal movement of each holder into a final position transversely of the light beam while disposed between the condenser and lens on movement of the latter, and means operable to operate the second, third and fourth mentioned means.

6. A machine of the class described, having the combination of a device for projecting a beam of light, said device consisting of a lens and a light condenser including an electric lamp, said lens being mounted for movement into and out of focal position with respect to said condenser, a plurality of film or plate holders, each holder being mounted on one end of a pivotally mounted arm whereby its holder may be brought into a projecting position interposing said condenser and lens, first and second electric circuits connected in parallel, electromagnetic devices and controllers therefor in said first circuit, there being one of said devices and its controller for each arm to cause the movement of the same to bring its holder into the projecting position, said lamp being in said second circuit, a normally open switch in said second circuit, means including an electromagnetic device in said second circuit to move said lens into its focal position on closing of said switch, said switch being positioned to be closed by means on each holder when the latter is in the projecting position to actuate the last mentioned means and also to light said lamp.

7. A machine of the class described having the combination of a device for projecting a light beam, said device consisting of a light condenser and a projecting lens in spaced relation, a film or plate holder, an arm mounted for movement into and out of a horizontally disposed position, said holder being pivotally mounted on said arm, spring means on the arm which acts on said holder to yieldably retain the latter in a position paralleling the arm, an abutment positioned to be engaged by said arm when the latter is in the horizontal position, said arm being of a length to bring the holder into a position interposing the condenser and the lens, means to move the arm into and out of horizontally disposed position, and means to move the holder on its pivot into a projecting position while it interposes the condenser and lens.

8. The invention defined in claim 7 in which the last mentioned means consists of a pusher on the condenser or the lens and a rigid member on the holder.

9. A machine of the class described having the combination of an indicating chart having a plurality of indexed plug receiving holes therein, a conducting plug optionally insertable in each of said holes, a pair of contacts adjacent each of said holes, a source of electrical energy, an electromagnetic device connected with said source and each pair of contacts for the purpose of energizing said device when said plug is inserted in the related hole to bridge said contacts, an arm mounted for movement and connected with said device to be moved thereby on energization of the device, a film or plate holder movable with said arm, a light beam projecting device including a projecting lens behind which said holder is moved by said arm on the energization of said device, and means to retract said arm to a normal position on deenergization of said device by withdrawing said plug.

10. In a machine of the class described, the combination of a device adapted to project a beam of light, said device consisting of a light condenser and a projecting lens, said condenser and lens being mounted for movement toward and away from each other, a plurality of holders each adapted to retain a film or plate having subject matter which may be projected on a screen or the like when brought into projecting position between the condenser and lens, means mounting each holder for movement into and out of its projecting position, means operated by means on each of said holders as it moves into the projecting position to move the condenser and lens toward each other to bring the lens into the proper focal position with respect to the condenser, and means to cause the condenser and lens to move out of focal positions when each holder is moved out of its projecting position.

11. In a machine of the class described, the combination of a device adapted to project a beam of light, said device consisting of a light condenser and a projecting lens, said condenser and lens being mounted for movement toward and away from each other, a plurality of holders each adapted to retain a film or plate having subject matter which may be projected on a screen or the like when brought into projecting position between the condenser and lens, means mounting each holder for movement into and out of its projecting position, means to selectively move said holders into and out of their projecting positions, means operated by means on each of said holders as it moves into the projecting position to move the condenser and lens toward each other to bring the lens into the proper focal position with respect to the condenser, and means to cause the condenser and lens to move out of focal positions when each holder is moved out of its projecting position.

12. In a machine of the class described, the combination of a series of individually swingable arms each having a film or plate holder pivoted thereon, means for swinging each of said arms to bring the holder into a predetermined position, means to cause the pivotal movement of each holder relative to its arm while in the aforesaid position into a projecting position, means to cause the return movement of each holder relative to its arm, and means to swing each arm to its original position.

13. In a machine of the class described, the combination of a series of individually swingable arms each having a film or plate holder pivoted thereon, a light condenser and projecting lens mounted for movement toward and away from each other into and out of a spaced focal relationship, means for swinging each of said arms to bring its holder into a predetermined position between the condenser and lens, means on said lens to cause the pivotal movement of each holder relative to its arm while in the aforesaid position into a projecting position by the movement of said lens, means to cause the return movement of each holder relative to its arm, and means to swing each arm to its original position.

HOWARD ROBERT TRYON.
JOHN G. NILSSON.